(12) United States Patent
Eberlein et al.

(10) Patent No.: US 6,314,289 B1
(45) Date of Patent: Nov. 6, 2001

(54) APPARATUS AND METHOD FOR TRANSMITTING INFORMATION AND APPARATUS AND METHOD FOR RECEIVING INFORMATION

(75) Inventors: Ernst Eberlein, Grossenseebach; Marco Breiling, Erlangen; Jan Stoessel, Nürnberg; Heinz Gerhäuser, Waischenfeld, all of (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 09/202,729

(22) PCT Filed: Dec. 3, 1998

(86) PCT No.: PCT/EP98/07850

§ 371 Date: May 17, 1999

§ 102(e) Date: May 17, 1999

(87) PCT Pub. No.: WO00/36783

PCT Pub. Date: Jun. 22, 2000

(51) Int. Cl.[7] ........................................................ H04Q 7/20
(52) U.S. Cl. ........................ 455/427; 455/3.02; 455/10; 714/746; 714/758; 375/225
(58) Field of Search ..................... 455/427, 3.02, 455/10, 12.1, 137; 714/701, 746, 764, 751, 752, 758, 767, 763, 786; 375/290, 264, 225, 250

(56) References Cited

U.S. PATENT DOCUMENTS 4,881,241   11/1989   Pommier .

(List continued on next page.)

FOREIGN PATENT DOCUMENTS 0 572 171 A1    5/1993   (EP) .

OTHER PUBLICATIONS

Samir Kallel, "Complementary Punctured Convolutional (CPC) Codes and Their Applications", IEEE Transactions on Communications, vol. 43, No. 6, Jun. 1999, pp 2005–2009.

(List continued on next page.)

Primary Examiner—William Trost
Assistant Examiner—Congvan Tran
(74) Attorney, Agent, or Firm—Dougherty & Clements LLP

(57) ABSTRACT

An apparatus for transmitting information comprises a bitstream source for providing a bitstream representing the information, a redundancy adding encoder for generating an encoded bitstream, which is arranged to output, for a first number of input bits, a second number of output bits, the second number of output bits having at least twice as many output bits as the first number of input bits, wherein the second number of output bits includes two portions of output bits, each portion of output bits individually allowing the retrieval of information represented by the first number of input bits, and the first portion of output bits being coded based on the bitstream in a different way with respect to the second portion of output bits. The apparatus further comprises a partitioner for partitioning the second number of output bits into the two portions of output bits and a transmitter for transmitting the output bits of the first portion via a first channel and the output bits of the second portion via a second channel, the second channel being spatially different from the first channel. An inventive receiving apparatus combines the signals received via the first and second channels and uses both channel signals for channel decoding by removing redundancy. Thus, the transmitting receiving system is suitable for providing time and/or space diversity and, in the optimal case, provides a C/N value which is greater than 4.3 dB with respect to a two-channel system comprising a duplicator in the transmitter and a channel-controlled switch in the receiver.

35 Claims, 4 Drawing Sheets

U.S. PATENT DOCUMENTS

| | | | |
|---|---|---|---|
| 5,103,459 | * | 4/1992 | Gilhousen et al. ............... 375/200 |
| 5,258,987 | * | 11/1993 | Wei ........................................ 371/43 |
| 5,319,673 | | 6/1994 | Briskman . |
| 5,485,485 | | 1/1996 | Briskman . |
| 5,581,575 | * | 12/1996 | Zehavi et al. ....................... 375/200 |
| 5,592,471 | | 1/1997 | Briskman . |
| 5,617,333 | * | 4/1997 | Oyamada et al. ............... 364/524 A |
| 5,657,325 | | 8/1997 | Lou et al. . |
| 5,659,569 | * | 8/1997 | Padovani et al. ................... 370/479 |
| 5,841,813 | | 11/1998 | van Nee . |
| 5,896,368 | * | 4/1999 | Dalman et al. ...................... 370/335 |
| 5,956,088 | * | 9/1999 | Shen et al. ........................... 348/385 |
| 6,134,696 | * | 10/2000 | Morelos-Zaragoza et al. ..... 714/790 |
| 6,144,711 | * | 11/2000 | Raleigh et al. ...................... 375/347 |
| 6,163,577 | * | 12/2000 | Ekudden et al. ..................... 375/242 |

OTHER PUBLICATIONS

Brian Kroeger, "Robust Modem and Coding Techniques for FM Hybrid IBOC DAB", USA Digital Radio Home Page, www.usadr.com, pp 1–14.

Benelli G., "Two New Coding Techniques for Diversity Communication Systems", IEEE Transactions on Communications, Sep. 1, 1990, pp. 1530–1538, vol. 38, No. 9, New York, US.

Alamouti S M, A simple transmit diversity techique for wireless communications, IEEE Journal on Selected Areas in Communications, Oct. 1998, pp. 1451–1458, vol. 16 No. 8.

ETS 300 401, ETS I—European Telecommunications Standards Institute Valbonne, France, Jan. 1997, pp 149–158.

"Punctured Convolutional Codes of Rate (n–l)n and Simplified Maximum Likelihood Decoding" J. Bibb Cain et al, IEEE Transactions on Information Theory, vol. IT–25, No. 1, Jan. 1979.

"Channel Coding with Multilevel/Phase Signals", Gottfried Ungerboeck, IEEE Transactions on Information Theory, vol. IT–28, No. 1, pp 55–66, Jan. 1982.

* cited by examiner

Input bit sequence:

After convolutional encoder:

E=Bit transmitted over early satellite
L=Bit transmitted over late satellite
X=not transmitted (punctured) bit After parallel-to-serial converter:

After demultiplexer:

APPARATUS AND METHOD FOR TRANSMITTING INFORMATION AND APPARATUS AND METHOD FOR RECEIVING INFORMATION

FIELD OF THE INVENTION

The present invention relates to concepts for digital broadcasting and, in particular, concepts for digital broadcasting suited for fading channels for wireless communication.

BACKGROUND OF THE INVENTION

Satellite-based broadcasting systems provide an adequate communication link only in rural areas, in which only a small number of e.g. bridges exist. Additionally, rural areas usually do not have skyscrapers. Skyscrapers as well as bridges or, generally, densly built-up areas are obstacles to satellite-based communication systems, since carrier frequencies used for such communication links involve that a channel between a sender, e.g., a satellite, and a receiver, i.e. a mobile or stationary receiver, is characterised by the line of visual contact (line of sight) between the sender and the receiver. If a skyscraper comes into the line of visual contact, i.e., the transmission channel between the satellite and the receiver, which may be positioned in a car, the received signal power will decrease substantially.

Generally, it can be stated that in wireless systems (radio systems), changes in the physical environment cause the channel to fade. These changes include both relative movement between transmitter and receiver and moving scatters/reflectors in the surrounding space. In theoretical studies of wireless systems, the real channels are usually modelled so that they result in trackable analysis. The two major classes of fading characteristics are known as Rayleigh and Rician. A Rayleigh-fading environment assumes no line of sight and no fixed reflectors/scatters. The expected value of the fading is zero. If there is a line of sight, this can be modelled by Rician-fading, which has the same characteristics as the Rayleigh-fading, except for a non-zero expected radio.

Modern digital broadcasting systems know several means for reducing the impact of a channel fading. These concepts comprise channel coding on the one hand and several kinds of diversity on the other hand. The European standard for digital audio broadcasting (DAB), set out in Radio Broadcasting Systems; Digital Audio Broadcasting (DAB) To Mobile, Portable and Fixed Receivers, ETS 300 401, ETS I—European Telecommunications Standards Institute, Valbonne, France, February 1995, uses differential quadrature phase-shift keying (DQPSK) as modulation technique. The channel encoding process is based on punctured convolutional coding, which allows both equal and unequal error protection. As a mother code, a convolutional code having a code rate of 1/4, a constraint length 7, and octal polynominals is used. The puncturing procedure allows the effective code rate to vary between 8/9 and 1/4. Channel coding by means of punctured convolutional codes is described in "Punctured Convolutional Codes of Rate (n−1)/n and Simplified Maximum Likelihood Decoding", J. Bibb Cain et al., IEEE Transactions on Information Theory, Vol. IT-25, No. 1, January 1979.

Punctured convolutional codes can be used in connection with many modulation techniques, such as OFDM, BPSK, QAM, etc.

Different channel encoding techniques are outlined in "Channel Coding with Multilevel/Phase Signals", Gottfried Ungerboeck, IEEE Transactions on Information Theory, Vol. IT 28, No. 1, pages 55 to 66, January 1982.

Bitstreams encoded by means of a convolutional encoder can be decoded by a decoder, in which the well-known Viterbi algorithm is implemented. This algorithm is capable of using the channel state information (see P. Hoeher "TCM on Frequency-Selective Length-Mobile Fading Channels", Proc. Tirrenia International Workshop Digital Communication, Tirrenia, Italy, September 1991). The Viterbi algorithm can be modified to provide reliability estimates together with the decoded sequence. This enables soft decoding. By applying a soft-output Viterbi algorithm, an improvement of about 2 dB is obtained in comparison to systems that implement "hard" decision.

DESCRIPTION OF PRIOR ART

With reference to FIG. 6, a simplified overview of a transmitter receiver system described in the European DAB Standard is illustrated. The transmitter receiver system generally comprises a transmitter section 60 and a receiver section 70. The transmitter section 60, in the simplest case, comprises a bitstream source 62, a channel encoder 64 and a transmitter 66. The receiver section 70, in the simplest case, comprises a receiver 72 and a channel decoder 74.

FIG. 7 illustrates a transmitting receiving setup providing for time diversity as well as space diversity. The transmitter section 60' comprises the bitstream source 62 and the encoder 64 that have already been described with respect to FIG. 6. In addition, the receiver section 60' comprises a first transmitter 66a and a second transmitter 66b. Both transmitters 66a and 66b are fed by the same signal output by the encoder 64 that is duplicated by a duplicator 67.

To obtain time diversity, a delay element 68 is coupled between the duplicator 67 and the second transmitter 66b.

In the case of satellite communication, the transmitters 66a and 66b are realised by two satellites that reside on different orbital positions spaced apart from each other.

The first channel is defined by the line of sight between the first transmitter and the receiver, for example, a car, whereas the second channel is defined by the line of sight between the second transmitter 66b and the car that comprises the receiving section 70'. In the scenario, in which the car travels on a street to the right and to the left of which are high buildings, the possibility is increased that the car will receive the transmitted signal from at least one satellite.

When the case is considered, in which the car is driving through a tunnel or under a bridge, the lines of sight to both transmitters 66a and 66b are interrupted. The time diversity method implemented by this system shown in FIG. 7, however, ensures that the receiver will not be affected by the interrupted channel, since the transmission signal is delayed by the delay stage 68. Optimally, no transmission interruption will result, when the delay time is equal to or greater than the travelling time of the car through the tunnel or under the bridge. Thus, the receiving section will, once again, receive the transmission signal sent by the transmitter 66a, when it was under the bridge, via a channel 2. Naturally, the receiving section 70' comprises another delay stage 78. As it is shown in FIG. 7, the delay stage 78 of the receiving section has to be in the channel that has not been delayed in the transmitter section. Thus, the signals at the output of the receivers 72a and 72b are identical, when the delay values of the delay stages 78 and 68 are equal.

A decision stage 79, which is symbolised as a switch in FIG. 7, determines which channel provides the signal with the better signal to noise ratio. When it is determined that channel 1 provides the stronger signal, the decision stage 79 is operative to conduct the signal received by the receiver 72a into the channel decoder 74 When it is determined in block 79 that the signal transmitted over the other channel (channel 2) is the stronger one, the decision stage 79 is operative to conduct the signal received by the receiver 72b to the channel decoder 74.

To summarise, the system illustrated in FIG. 7 comprises the following essential features:

the signal output by the encoder 64 is duplicated by the duplicator 67;

exactly the same signals, whether delayed or not, are transmitted via both channels;

the signals transmitted over both channels are derived from the bitstream output by the bitstream source 62 in exactly the same way by means of the encoding process carried out in the redundancy adding encoder 64 (repetition code);

the decision stage 79 compares the signal to noise ratio of both channels and selects the channel in which the signal having the better signal to noise ratio is transmitted;

the signal transmitted via the other channel is discarded; and the channel decoder 74 only uses one channel, i.e., the channel determined by the decision stage 79, for channel decoding.

Besides the technique of channel encoding using a redundancy adding encoder like a convolutional encoder, different types of diversity, e.g., time diversity and space diversity, can be implemented to ease the impact of fading channels.

The bitstream source 62 can be implemented as an audio encoder as defined by ISO-MPEG. It provides a bitstream comprising useful information, i.e., encoded spectral values of a block of audio samples, and side information. To enhance the robustness of the communication link, a forward error correction encoding is performed by the convolutional encoder 64. In general, the convolutional encoding procedure generates redundancy in the transmitted datastream in order to provide ruggedness against transmission distortion.

Usually, convolutional encoders consist of a specific number of shift registers and a number of XOR gates. The convolutional encoder described in the ETS Standard is a convolutional encoder having a code rate of 1/4. This means that the convolutional encoder produces four output bits for one input bit. As it is well known in the art, each output bit is derived from the current input bit and a specific combination of a certain number of preceding input bits stored in the shift registers. The specific combination of the current input bit and certain preceding input bits for each encoder output bit is defined by the so-called generator polynominals. The octal forms of the generator polynominals defined in the ETS 300 401 are 133, 171, 145 and 133.

The encoded bitstream can be punctured for raising the code rate from 1/4 to another code rate, e.g., 8/9. "Puncturing" means that certain bits in the convolutional encoder output bits are discarded and not forwarded to the transmitter 66. Thus, puncturing operates to again reduce redundancy in an encoded bitstream, which has been added by the convolutional encoder.

The transmitter 66 may comprise usual transmitter elements, such as a QPSK modulator, an IFFT block (IFFT= Inverse Fast Fourier Transform) for performing orthogonal frequency division multiplexing, a guard interval inserter, a synchronisation sequence inserter and modulation means for modulating the signal onto a high frequency carrier.

Analogously, the receiver 72 comprises an HF front end, an analog/digital converter, and a QPSK demodulator. The signal output by the receiver is input in the decoder 74. The decoder 74 is operative to decode the encoded bitstream output by the receiver 72. In modern communication systems, the decoder 74 implements the above-outlined soft-input Viterbi algorithm. As it has already been outlined, the Viterbi decoder performs a maximum likelihood decoding using the channel state information, which is also called "metric". Different algorithms are known for Rician and Rayleigh channels.

Especially in satellite-based communication systems, design engineers are confronted with strong demands for reducing transmitter power. Reduced transmitter power directly translates into system costs. Generally, the costs for designing and transporting the satellite(s) into its (their) orbital position(s) are directly proportional to the power supply needed on board of the satellite. Higher transmitter power on board of the satellite also means higher energy producing capabilities of the satellite. Thus, it can be stated that, under costs aspects, reducing transmitter power is essential.

Therefore, the system described in FIG. 7 is disadvantageous in that, in the receiver, only one channel is used for retrieving information, whereas the other channel is discarded. In extreme situations, in which one channel has faded totally, no transmitter power from one transmitter, i.e., one satellite, will reach the receiver. Normally, however, the channels will not fade totally. Instead, both channels will fade more or less. Thus, the decision stage 79 has to select one out of two useful signals. When the case is considered that both signals output by the receivers 72a and 72b have identical signal to noise ratios, only one signal is selected, whereby the transmitter power from the satellite transmitting via the other channel is wasted totally.

SUMMARY OF THE INVENTION

It is the object of the present invention to provide an apparatus and method of transmitting information and an apparatus and method of receiving information, which result in better receiver output signal quality and/or reduced transmitter power demands.

In accordance with a first aspect of the present invention, this object is attained by an apparatus for transmitting information, comprising a bitstream source for providing a bitstream representing the information; a redundancy adding encoder for generating an encoded bitstream based on the bitstream provided by the bitstream source wherein the encoder is arranged to output, for a first number of input bits, a second number of output bits, the second number of output bits having at least twice as many output bits as the first number of input bits, and wherein the second number of output bits includes two portions of output bits, each portion of output bits individually allowing the retrieval of information represented by the first number of input bits, and the first portion of output bits being coded based on the bitstream in a different way with respect to the second portion of output bits; a partitioner for partitioning the second number of output bits into the two portions of output bits; and a transmitter for transmitting the output bits of the first portion via a first channel and the output bits of the second portion via a second channel, the second channel being spatially different from the first channel.

In accordance with a second aspect of the present invention, this object is attained by an apparatus for receiving information, the information being represented by an encoded bitstream, the encoded bitstream being encoded such that its redundancy is at least doubled with respect to a bitstream from which the encoded bitstream is derived, and that, for a first number of bits of the bitstream, the encoded bitstream comprises a second number of bits, the second number of bits having at least twice as many bits as the first number, and wherein the second number of bits includes two portions of bits, each portion of bits individually allowing the retrieval of information represented by the first number of bits, and the first portion of the bits being encoded in a different way with respect to the second portion of bits, the apparatus comprising a receiver for receiving the first portion of bits via a first channel and the second portion of bits via a second channel, the first and the second channels being spatially different from each other; a combiner for combining the first and the second portions; and a decoder for decoding the coded bitstream by removing redundancy from the coded bitstream, the decoder using the first and second portions of bits combined by the combiner.

In accordance with a third aspect of the present invention, this object is attained by a method of transmitting information, comprising the following steps: providing a bitstream representing the information; generating a redundancy added encoded bitstream based on the bitstream provided in the step of providing, wherein for a first number of input bits, a second number of output bits is generated, the second number of output bits having at least twice as many output bits as the first number of input bits, and wherein the second number of output bits includes two portions of output bits, each portion of output bits individually allowing the retrieval of information represented by the first number of input bits, and the first portion of output bits being coded based on the bitstream in a different way with respect to the second portion of output bits; partitioning the second number of output bits into the two portions of output bits; and transmitting the output bits of the first portion via a first channel and the output bits of the second portion via a second channel, the second channel being spatially different from the first channel.

In accordance with a fourth aspect of the present invention, this object is attained by a method of receiving information, the information being represented by an encoded bitstream, the encoded bitstream being encoded such that its redundancy is at least doubled with respect to a bitstream from which the encoded bitstream is derived, and that, for a first number of bits of the bitstream, the encoded bitstream comprises a second number of bits, the second number of bits having at least twice as many bits as the first number, and wherein the second number of bits includes two portions of bits, each portion of bits individually allowing the retrieval of information represented by the first number of bits, and the first portion of the bits being encoded in a different way with respect to the second portion of bits, the method comprising the following steps: receiving the first portion of bits via a first channel and the second portion of bits via a second channel, the first and the second channels being spatially different from each other; combining the first and the second portions; and decoding the coded bitstream by removing redundancy from the coded bitstream, wherein the first and second portions of bits combined in the step of combining are used in the step of decoding.

The present invention is based on the finding that, although there are two physically different channels both channels are considered as one single channel from the viewpoint of the channel decoder located in the receiving section. This means that the channel decoder in the receiving section does not know that the signals it decodes stem from two physically, i. e. spatially, different channels. However, the inventive system, in fact, provides two different physical channels to allow for time and/or space diversity.

The space diversity can be obtained by two terrestrial transmitters, by two satellite transmitters or by one satellite transmitter and one terrestrial transmitter.

In accordance with the present invention, an apparatus for transmitting information comprises a bitstream source for providing a bitstream representing the information. A redundancy adding encoder for generating an encoded bitstream based on the bitstream provided by the bitstream source is arranged to output, for a first number of input bits, a second number of output bits, the second number of output bits having at least twice as many output bits as the first number of input bits, and wherein the second number of output bits includes two portions of output bits, each portion of output bits individually allowing the retrieval of information represented by the first number of input bits, and the first portion of output bits being coded based on the bitstream in a different way with respect to the second portion of output bits. A means for partitioning, i.e., a partitioner, receives the output of the redundancy adding encoder and partitions the second number of output bits into the two portions of output bits. Means for transmitting transmit the output bits of the first portion via a first channel and the output bits of the second portion via a second channel, wherein the second channel is spatially different from the first channel.

In accordance with another aspect of the present invention, an apparatus for receiving information comprises a receiver for receiving the first portion of bits via a first channel and the second portion of bits via a second channel, a combiner for combining the first and the second portions and a decoder for decoding the coded bitstream by removing redundancy from the coded bitstream, the decoder using the first and second portions of bits combined by the combiner.

This inventive transmitter receiver concept provides the following advantages:

two channels allow time and/or space diversity;

the partitioner partitions rather than duplicates the output signal of the encoder into two portions of output bits;

the combiner in the receiver combines rather than selects the signals received from both channels and feeds the combined signal into the channel decoder;

the signals from both channels are used for decoding all the time;

in the best case, in which the signal powers in both channels are identical, transmitter power used for transmitting via each channel can be halved at least, thus, halving system costs with respect to the system illustrated in FIG. 7; and when the transmitter powers are not changed, the signal quality output by the channel decoder can be considerably improved.

BRIEF DESCRIPTION OF THE DRAWINGS

The foregoing and other objects, features and advantages of the invention will become more readily apparent from the following detailed description of preferred embodiments which proceeds with reference to the drawings.

DESCRIPTION OF PREFERRED EMBODIMENTS

Figure 1:
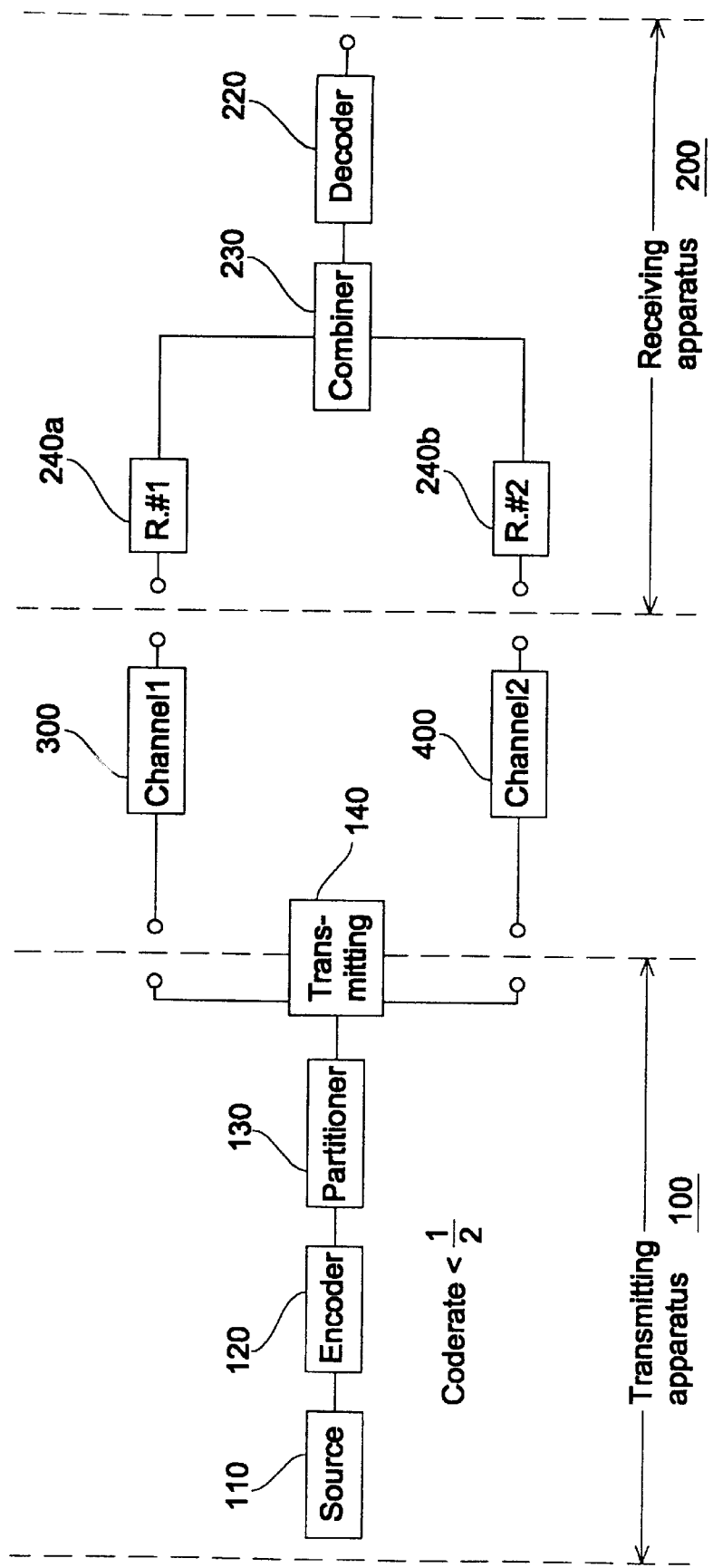
FIG. 1 shows a principle overview of a transmission receiving system in accordance with the present invention, comprising an inventive transmitter and an inventive receiver.

In FIG. 1 a general block diagram of an inventive apparatus for transmitting 100 and an inventive apparatus for receiving 200 is illustrated. The transmitting apparatus 100 comprises a bitstream source 110, a redundancy adding encoder 120 and a partitioner 130. The bitstream source 110 may be an MPEG encoder as described above. The encoder 120 is generally a redundancy adding encoder for generating an encoded bitstream on its output, wherein the encoder 120 is arranged to output, for a first number of input bits, a second number of output bits, the second number of output bits having at least twice as many output bits as the first number of input bits. This means that the encoder 120 implements a code rate equal to or less than 1/2. As it is known in the art, the code rate is defined by the number of input bits divided by the number of output bits produced by the encoder based on the number of input bits. In other words, a code rate 1/2 means that for each input bit, two output bits are produced. Analogously, a code rate of 1/3 means that for each input bit, three output bits are produced. Similarly, a code rate of 3/8 means that for three input bits, eight output bits are produced.

The code rate of the encoder 120 is set to be smaller than 1/2, such that the second number of output bits can be sub-divided into two portions of output bits, such that each portion of output bits individually allows the retrieval of information represented by the first number of input bits This means that a decoder 220 located in the receiving apparatus is able to retrieve information represented by the bitstream output by the bitstream source 110 when only one channel, i.e., channel 1 300 or channel 2 400 provides a useful signal, whereas the other channel has faded totally.

Another feature of the encoder 120 is that the first portion of output bit is coded based on the bitstream in a different way with respect to the second portion of output bits. In contrast to a simple repetition code in which redundancy is doubled by simply duplicating a signal to transmitted coded, the channel decoder 220 capabilities are enhanced, since the signal is transmitted over the channels 300 and 400 are derived from the bitstream output by the bitstream source 110 independently of each other. The partitioner 130 feeds means for transmitting, i.e., a transmitter, 140 for transmitting the first portion of output bits via the first channel 300 and the second portion of output bits via the second channel 400. It is to be noted that both channels 300 and 400 are spatially different from each other.

As usual, a channel between the transmitter and the receiver is defined by the line of sight connection between the transmitter and the receiver. Thus, two channels are different from each other when a mobile receiver has moved with respect to a single transmitter, or when two transmitters exist positioned in different locations, e.g., orbital positions. In this case, it does not play any role whether the receiver is a mobile or a stationary receiver.

Thus, the transmitting means 140 may comprise one transmitter, e.g., one satellite and a delay stage, such that two different channels are created between the single transmitter and a mobile receiver, when the mobile receiver is at a first position and between the single transmitter and the mobile receiver when the mobile receiver has moved to a second position after the period defined by the delay stage in the transmitter. This concept is called time diversity for mobile receivers. Naturally, it is not possible to create two channels different from each other between a single stationary transmitter and a stationary receiver.

Alternatively, as it is described with reference to FIG. 2, the transmitting means 140 comprise two transmitters positioned in different locations, to obtain space diversity.

The receiving apparatus 200 illustrated in FIG. 1 comprises receiving means 240a and 240b, the receiving means, i.e., the receiver, comprising a first receiver 240a for receiving the first portion of output bits transmitted via the first channel 300 and a second receiver 240b for receiving the second portion of output bits via the second channel 400.

In accordance with the present invention, the output signals of the receiving means 240a and 240b are combined in a combiner 230 such that the output signals of both receivers are used in the channel decoder 220.

Figure 2:
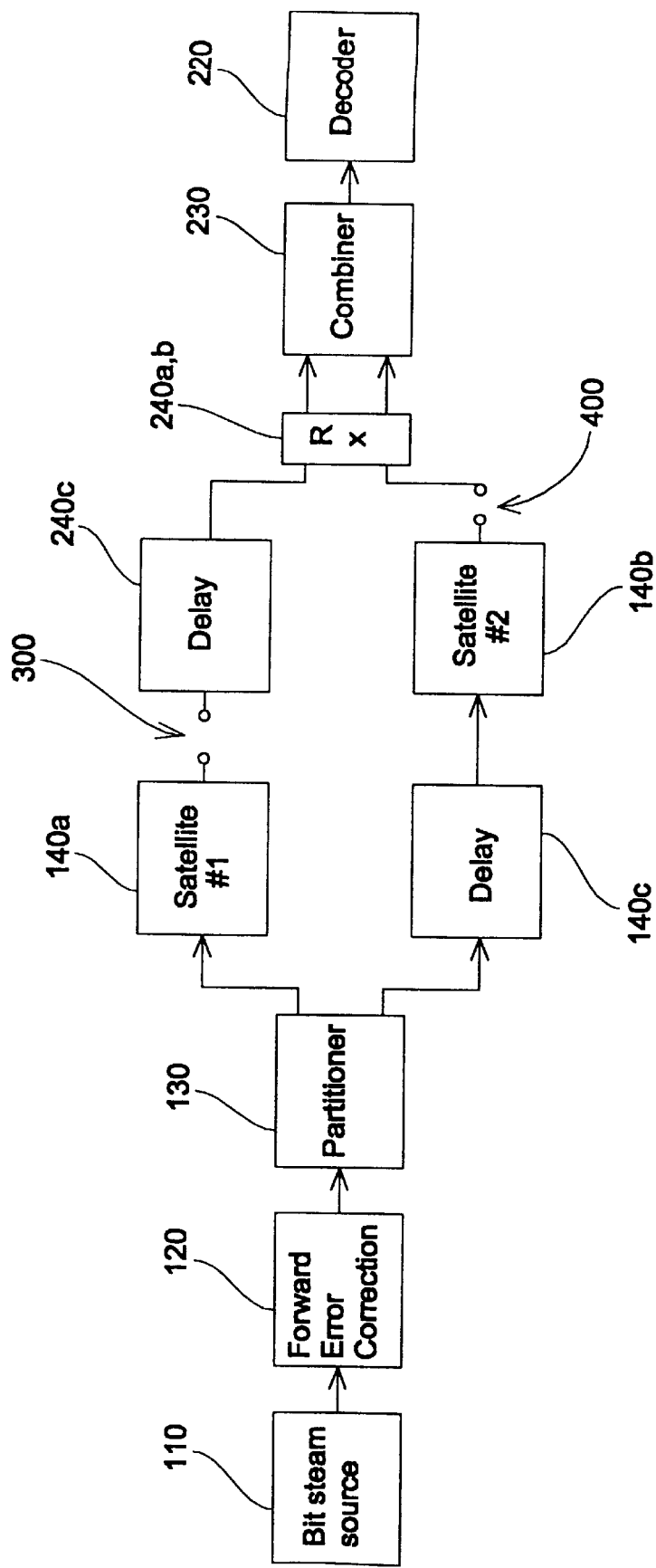
FIG. 2 shows a more detailed block diagram of the transmission receiving system shown in FIG. 1, in which time and space diversity are embodied.

FIG. 2 illustrates a transmission receiving system in accordance with the preferred embodiment of the present invention. The transmitting apparatus comprises, as already described in FIG. 1, the bitstream source 110, the encoder 120 generally termed as forward error correction, the partitioner 130 and transmitting means comprising a first satellite 140a, a second satellite 140b and a delay stage 140c.

The receiving apparatus comprises the channel decoder 220, the combiner 230 and the receiving means (Rx) comprising the first and second receivers 240a, 240b and a delay stage 240c. The transmitting apparatus and the receiving apparatus are "connected" by the first channel 300 and the second channel 400.

By using the delay stages 140c and 240c, which are positioned in opposite channels, time diversity is implemented in the transmission receiving system shown in FIG. 2. Furthermore, by means of the provision of two transmitters, i.e., the first satellite 140a and the second satellite 140b, space diversity or spatial diversity is implemented into the inventive transmission receiving system.

Figure 3:
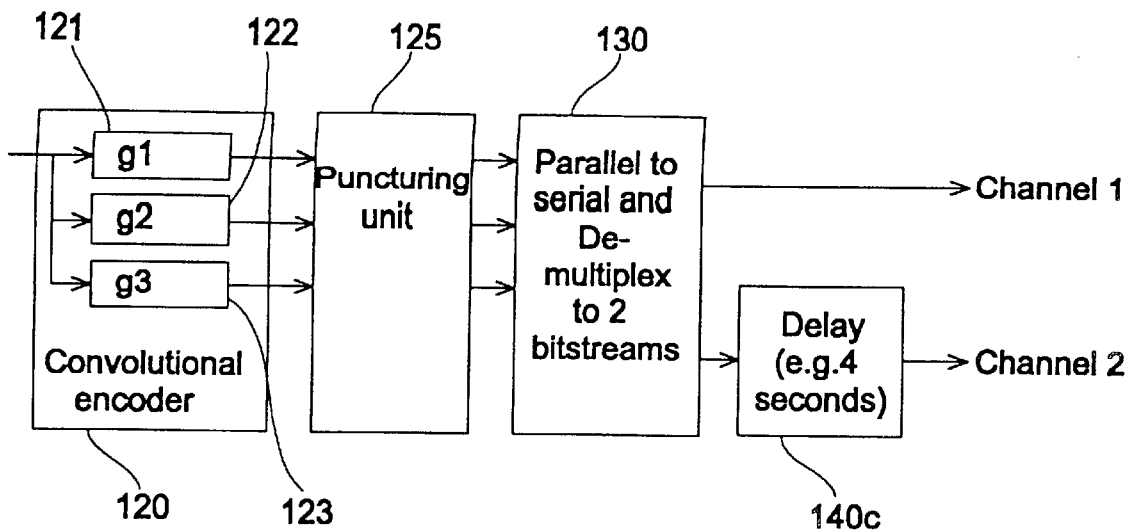
FIG. 3 shows a detailed block diagram of an inventive transmitter section.

With reference to FIG. 3, a more detailed block diagram of the transmitting apparatus is described. The encoder 120 in the transmitting apparatus is implemented as a convolutional encoder in accordance with the present invention. As it is shown in FIG. 3, the convolutional encoder comprises three generator polynominals, i.e., a first generator polynominal g1 121, a second generator polynominal g2 122 and a third generator polynominal g3 123. Thus, the convolutional encoder 120 has a code rate of 1/3, since, for one input bit, the encoder produces three output bits. The transmitting apparatus shown in FIG. 3 further comprises a puncturing unit 125 that reduces the number of bits, i.e., the number of output bits, such that an even number of output bits to be transmitted over the first and second channel is obtained. The puncturing unit 125 is connected to the partitioner 130, that, in accordance with the preferred embodiments of the present invention, comprises a parallel-to-serial converter and a demultiplexer to demultiplex the serial bitstream produced by the parallel-to-serial converter into two bitstreams. The block diagram in FIG. 3 further comprises the delay stage 140c of the transmitting means. The first transmitter and the second transmitter are not shown in FIG. 3.

Thus, the first portion of output bits is transmitted via the first channel, whereas the second portion of output bits is delayed by the delay stage, transmitted via the second channel.

Figure 4:
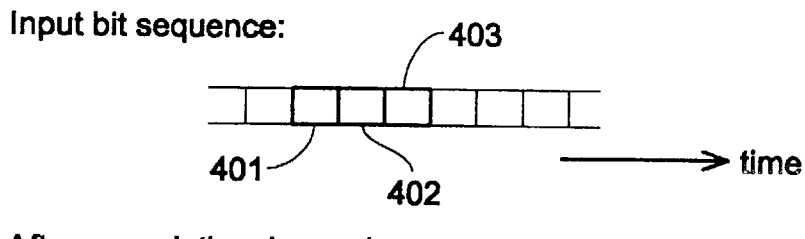
FIG. 4 shows an input bit sequence and an output bit pattern of a convolutional encoder used in an inventive transmitter section.
Figure 4:
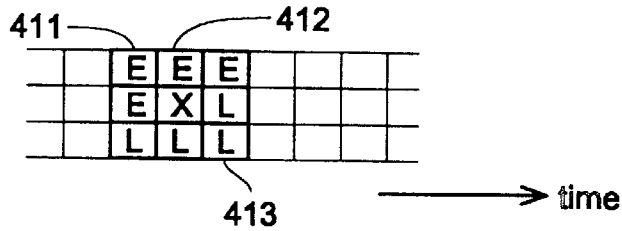
Figure 4:
Figure 4:
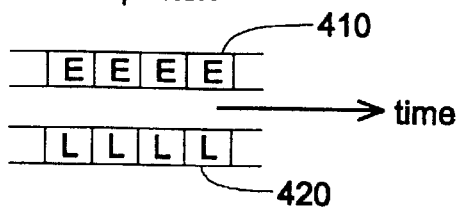

With reference to FIG. 4, the functionality of the convolutional encoder 120, the puncturing unit 125 and the partitioner 130 will be described. In FIG. 4, an input bit sequence having bits 401, 402 and 403 is illustrated. The convolutional encoder 120 will produce three parallel arranged output bits 411, 412 and 413 for each input bit 401, 402 and 403. The notation of the output bits 411 to 413 relates to the channel, over which the respective bit is transmitted. Thus, bits termed E are transmitted over the early satellite, i.e., satellite 140a (FIG. 2), whereas the bits termed L are transmitted over the late satellite, i.e., the satellite 140b (FIG. 2), which input is delayed by the delay stage 140c. The bit termed X is not transmitted at all. This bit is discarded by the puncturing unit 125 to obtain a second number of output bits, which is an even number. In accordance with the preferred embodiment of the present invention, an even number of output bits to be transmitted by the transmitting means 140 (FIG. 1) is required, since two channels exist and the number of bits transmitted over each channel are equal in the preferred embodiment. It has to be noted that equal numbers of bits in each channel are not essential for the present invention.

The output of the puncturing unit 125 is fed into a parallel-to-serial converter included in the combiner 130 (FIG. 3) such that a serial bitstream, i.e., the second number of output bits, is obtained. The demultiplexer included in the partitioner 130 demultiplexes the serial bitstream output by the parallel-to-serial converter into two bitstreams, in order to produce the first portion 410 and the second portion 420 of output bits.

It has to be noted that the number of bits in each of the first and second portions 410 and 420 is larger than the first number of input bits 401, 402 and 403 input into the convolutional encoder 120. Thus, some redundancy still exists to be used by the channel decoder 220 (FIG. 2), when one channel is totally lost, for instance, when a mobile receiver is under a bridge. In general, however, it is not required that the first and second portion of output bits comprise more bits than the first number of input bits, since both portions together still have a code rate of 1/2, whereas each portion of output bits 410, 420 has a code rate of 1 when the convolutional encoder 120 has a code rate of 1/2.

Referring back to FIG. 4, a convolutional encoder having a code rate of 3/8 is described. This means that for a first number of input bits, the first number being 3, a second number of output bits, the second number being 8, is produced.

Figure 5:
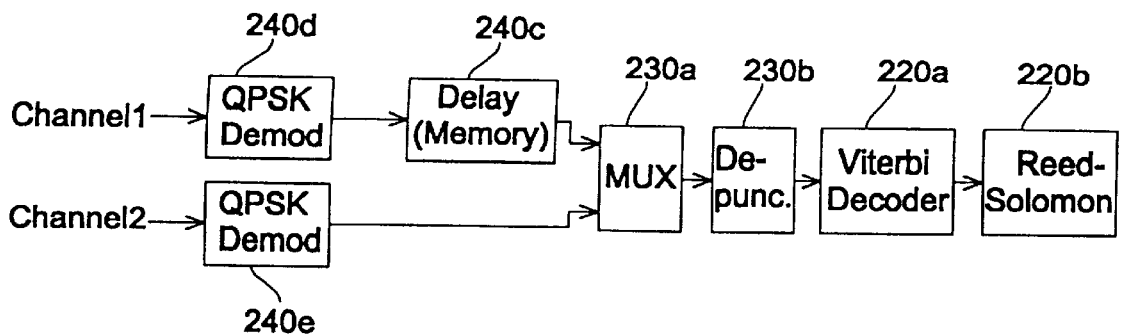
FIG. 5 shows a detailed view of an inventive receiver section.
Figure 6:
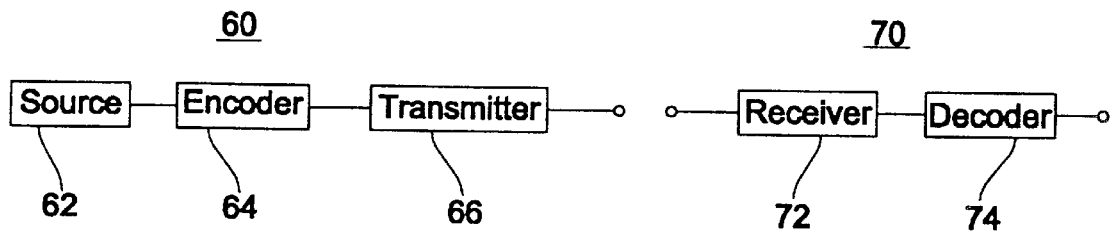
FIG. 6 shows a generalised block diagram of a prior art transmitting receiving system.

Referring to FIG. 5, a preferred embodiment of the receiving apparatus is described. Optionally, the receiving means comprises a QPSK demodulator 240d for receiving the first channel and a QPSK demodulator 240e for receiving the second channel. Naturally, the QPSK demodulators 240d and 240e only have to be provided when the transmitting apparatus has performed a QPSK modulation. The output of the QPSK demodulator is fed into the delay stage 240c and then into a multiplexer 230a. The output of the QPSK demodulator 240e is directly fed into the multiplexer 230a. Thus, the multiplexer 230a receives the first portion of output bits (410 in FIG. 4) and the second portion of output bits (420 in FIG. 4) for producing one single serial bitstream comprised of the first portion and the second portion. This continuous serial bitstream is input into a depuncturing unit 230b for undoing the puncturing carried out by the puncturing unit 125 (FIG. 3).

Then, the depunctured bitstream, i.e., the combined bitstream output by the combiner that comprises the multiplexer 230a and the depuncturing unit 230b, is input into the channel decoder that, in accordance with the preferred embodiment of the present invention, comprises the Viterbi decoder 220a and a Reed-Solomon decoder 220b. Those skilled in the art will know that the Reed-Solomon decoder only has to be provided when a Reed-Solomon coding has been carried out in the transmitting apparatus. In accordance with the preferred embodiment of the present invention, the transmitting apparatus causes a concatenated forward error correction encoder having a convolutional encoder and a Reed-Solomon encoder. Thus, the receiving apparatus has to comprise a Viterbi decoder 220a and a Reed-Solomon decoder 220b. It is known in the art that convolutional encoders may create small burst errors. The Reed-Solomon encoder, however, is well suited for such burst errors.

In the following, the inventive transmitting receiving system illustrated in FIG. 1, which makes use of an encoder having a code rate less than 1/2, and has a partitioner and a combiner is compared to the transmission receiving system shown in FIG. 7 that makes use of a duplicator and a channel decision controlled switch.

To ease the comparison of both systems, it is assumed that the encoders 120 (FIG. 1) and 64 (FIG. 7) comprise a convolutional encoder and a Reed-Solomon encoder. Furthermore, it is assumed that the convolutional encoder included in the redundancy adding encoder 120 of FIG. 1 implements a code rate of 3/8, whereas the convolutional encoder included in the redundancy adding encoder 64 of FIG. 7 encodes based on a code rate of 3/4. Since the transmitting apparatus shown in FIG. 7 transmits eight output bits for three input bits, i.e., the duplicator effectively doubles the output bits to be transmitted, it can be regarded as a redundancy adding encoder having a code rate of 3/8. The signals transmitted over the first and the second channels, however, are identical and identically derived from the bitstream output by the bitstream source 62.

Figure 7:
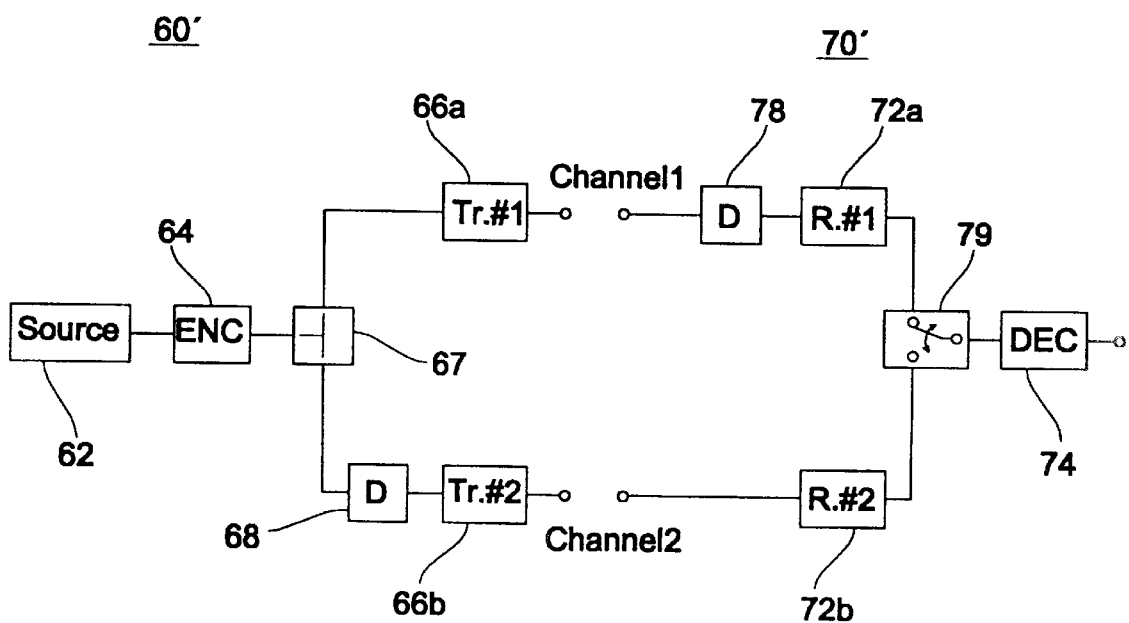
FIG. 7 shows a block diagram of a transmitter receiver system implementing time and space diversity, in which the output of the transmitter encoder is duplicated and a channel selection is performed in the receiver.

According to the code rate of 3/4 (convolutional coder only), for three information bits, four channel bits are transmitted over each satellite in the system of FIG. 7 Using two satellites, eight channel bits are transmitted for three information bits. Thus, it is clear that the system shown in FIG. 7 can be regarded as a system having a code rate of 3/8.

According to the literature and system simulation results, the following $E_b/N_o$ performance can be assumed. It is noted that the term $E_b/N_o$ represents the ratio of the energy per useful bit rate (unit factor: W/sec) to noise power density (unit facor: W/sec). Thus, the "unit factor" of $E_b/N_o$ is 1. For QPSK, the C/N (=Power of transmitted signal/noise power within effective bandwidth) can be calculated by the following equation:

$$C/N = E_b/N_o + 10 \cdot \log(R) + 3 \text{ dB} (C/N \text{ and } E_b/N_o \text{ values in dB})$$

In this equation, R is the code rate. It is to be noted that the term C/N represents the "link margin". If the real C/N is higher than the link margin, a useful communication link is obtained. If the real C/N is lower than the C/N defined by the above-outlined equation, no satisfying communication link can be established.

The following Table gives the C/N in dB for three different code rates. The first line of the Table relates to the system shown in FIG. 7, whereas the third line of the Table relates to the inventive system shown in FIG. 1. The factor (223/255) relates to the Reed-Solomon encoder. The factors 3/4, 1/2 and 3/8 relate to the convolutional coders "Rate".

TABLE

| Code rate (convol. + Reed-Solomon) | Eb/NO [dB] | C/N [dB] |
|---|---|---|
| 3/4 * (223/255) = 0.66 | 3.7 | 4.9 |
| 1/2 * (223/255) = 0.44 | 2.7 | 2.1 |
| 3/8 * (223/255) = 0.33 | app. 2.4 | 0.6 |

In the following, the Table is explained. The required C/N value also applies to a system where the bitstream is de-multiplexed to two streams and transmitted using two QPSK modulators. The overall transmitted power is defined as:

$$C=C_{sat1}+C_{sat2}.$$

The noise power is defined as follows:

$$N=N_1+N_2.$$

It is assumed that the signal power is identical for satellites 1 and 2, which is the best case for the inventive method. With $N_1=N_2$ and $C_{Sat1}=C_{Sat2}$ (the effective bandwidth is identical for both signals, i.e., channels), the following equation applies:

$$\frac{C}{N} = \frac{C_{Sat1}+C_{Sat2}}{N_1+N_2} = \frac{2C_{Sat1}}{2N_1} = \frac{C_{Sat1}}{N_1} = \frac{C_{Sat2}}{N_2}$$

Assuming the available signal power (=C) and the QPSK symbol rate are kept, the method in accordance with the present invention can give a gain of 4.3 dB compared to the required C/N, if one signal is decoded only (system of FIG. 7). It is assumed that for other scenarios, i.e., both channels show different fading characteristics, the gain is lower. At least for the scenario $C_{Sat1}/N$ or $C_{Sat2}/N$ being greater than 4.9 dB, no gain is required. The output signal is error free in any case. The overall gain of the inventive transmission receiving system depends on the probability of the scenario. In other words, it is possible to receive the signal down to a C/N of 0.6 dB, which is a theoretical value that does not include implementation loss. If only one satellite signal is available, the required $C/N_o$ is equal to 67 dBHz (not including implementation loss). The unit factor dBHz represents power divided by power density in logarithmical terms.

As it has been described with respect to FIGS. 3 and 4, a convolutional encoder with a code rate of 1/3 is preferred The output of the convolutional enocoder is punctured to a code rate of 3/8 by not transmitting one channel bit out of 9. The output of the convolutional encoder and puncturing unit is converted into a serial form and demultiplexed. Four bits out of 8 are transmitted over satellite 1, i.e., the first portion of output bits. The other four bits are transmitted over satellite 2, i.e., the second portion of output bits. Optionally, an additional time interlever can be used.

As it has been outlined in the introductory portion, the polynominals g1, g2 and g3 describe the shift registers and modulo-2 adders or XOR gates which generate the convolutional code having a code rate of 1/3. The proposed polynominals are as follows:

g1=1100111 (binary)=147 (octal)
g2=1011101 (binary)=135 (octal)
g3=1110011 (binary)=163 (octal)

It should be noted that generator polynomials different from the above mentioned generator polynomials combined with certain puncturing schemes may be used as well (see J. Bibb Cain supra). However, the above given generator polynomials work very well in connection with the puncturing scheme described herein.

The receiver shown in FIG. 5 requires one Viterbi decoder only. The optimal combining with respect to the signal quality of the two signals is automatically performed by the Viterbi decoder. The Viterbi decoder performs maximum likelihood decoding using the channel state information, also called "metric". Algorithms known for Rician and Rayleigh channels can be adapted. If only one signal is available, i.e., one channel is faded totally, the input of the Viterbi decoder can be considered as a convolutional encoder having a code rate of 1/3 punctured to a code rate of 3/4. The equivalent puncturing scheme is:

For the early satellite 111
100
000 and for the late satellite 000
001
111

In accordance with a preferred embodiment of the present invention, a Viterbi decoder implementing a soft decision based on probabilities is used. Thus, the depuncturing unit inserts probabilities rather than actual bit states. Since the depuncturing unit does not have any information about the bits punctured by the puncturing unit in the transmitting apparatus, it inserts probabilities of 0.5 for the low and the high states of the bits.

Optionally, the combiner 230 (FIG. 1) additionally comprises a channel estimator, that evaluates the signal to noise ratio of signals received from each channel. When the channel estimator determines low signal to noise ratios, it is adapted to insert 0.5 probabilities rather than the actual probabilities derived from the channel having a low signal to noise ratio. Thus, it can be ascertained that the maximum likelihood decoder is not misled by signals received via a channel having a low signal to noise ratio.

Although the preferred embodiment of the present invention has been described with respect to two channels, the inventive concept can also be applied to a transmission system comprising three or more channels. In the case of three channels, the code rate of the channel encoder 120 (FIG. 1) is to be 1/3 or less. Additionally, the partitioner produces three portions of output bits rather than two portions of output bits. In this case, the transmitting apparatus as described in FIG. 3 can be used. However, no puncturing unit is necessary and the demultiplexer multiplexes three bitstreams, one for each of the three channels. After reading this specification, it is obvious for those skilled in the art that the present invention even can be extended to four or more channels.

Although the preferred embodiment of the present invention uses a convolutional encoder which is optionally extended by means of a Reed-Solomon encoder, other redundancy adding encoders can be adapted. These redundancy adding encoders, however, have to produce two portions of output bits that are coded differently with respect to each other, such that a "real" code rate of, for example, 3/8 in contrast to a doubled 3/4 code rate can be obtained.

The delay imposed by the different delay stages can be set in accordance with the real environment. Normally, a delay of four seconds is regarded as appropriate. However, other delay values can be adapted. It is to be noted, however, that high delay values result in high memory capacities for the transmitter and the receiver.

What is claimed is:

1. An apparatus for transmitting information, comprising:
   a bitstream source for providing a bitstream representing the information;
   a redundancy adding encoder for generating an encoded bitstream based on the bitstream provided by the bitstream source wherein the encoder is arranged to output, for a first number of input bits, a second number of output bits, the second number of output bits having at least twice as many output bits as the first number of input bits, and wherein the second number of output bits includes two portions of output bits, each portion of output bits individually allowing the retrieval of information represented by the first number of input bits, and the first portion of output bits being coded based on the bitstream in a different way with respect to the second portion of output bits;
   a partitioner for partitioning the second number of output bits into the two portions of output bits;
   a transmitter for transmitting the output bits of the first portion via a first channel and the output bits of the second portion via a second channel, the second channel being spatially different from the first channel;
   the transmitter being a single transmitter;
   the first channel being defined by the single transmitter and a first position of a mobile receiver;
   the second channel being defined by the single transmitter and a second position of the mobile receiver; and
   the transmitter further includes delay means for delaying the second portion of output bits transmitted via the second channel such that time diversity is obtained.

2. An apparatus for transmitting information, comprising:
   a bitstream source for providing a bitstream representing the information;
   a redundancy adding encoder for generating an encoded bitstream based on the bitstream provided by the bitstream source wherein the encoder is arranged to output, for a first number of input bits, a second number of output bits, the second number of output bits having at least twice as many output bits as the first number of input bits, and wherein the second number of output bits includes two portions of output bits, each portion of output bits individually allowing the retrieval of information represented by the first number of input bits, and the first portion of output bits being coded based on the bitstream in a different way with respect to the second portion of output bits;
   a partitioner for partitioning the second number of output bits into the two portions of output bits; and
   means for transmitting the output bits of the first portion via a first channel and the output bits of the second portion via a second channel, the second channel being spatially different from the first channel;
   the means for transmitting including a first transmitter and a second transmitter spaced apart from the first transmitter;
   the first channel being defined by the first transmitter and the receiver; and
   the second channel being defined by the second transmitter and the receiver such that space diversity is obtained.

3. The apparatus of claim 2, in which:
   the first and second transmitters include two satellites in different orbital positions, such that the first channel is defined by an uplink connection from earth to the first satellite and a downlink connection from the first satellite to a receiver on earth, and such that the second channel is defined by a uplink connection from earth to the second satellite and a downlink connection from the second satellite to the receiver on earth.

4. The apparatus of claim 2, in which:
   one transmitter includes a satellite; and
   the other transmitter includes a terrestrial sender such that terrestrial diversity is obtained.

5. The apparatus of claim 2, in which the transmitter further includes delay means for delaying the second portion of output bits transmitted via the second channel such that time diversity is obtained.

6. An apparatus for transmitting information, comprising:
   a bitstream source for providing a bitstream representing the information;
   a redundancy adding encoder for generating an encoded bitstream based on the bitstream provided by the bitstream source wherein the encoder is arranged to output, for a first number of input bits, a second number of output bits, the second number of output bits having at least twice as many output bits as the first number of input bits, and wherein the second number of output bits includes two portions of output bits, each portion of output bits individually allowing the retrieval of information represented by the first number of input bits, and the first portion of output bits being coded based on the bitstream in a different way with respect to the second portion of output bits, the redundancy adding encoder including a convolutional encoder for obtaining a code rate less than or equal to 0.5, wherein the code rate is the ratio of the first number of input bits to the second number of output bits, the convolutional encoder combining a current input bit to be encoded with at least one of a certain number of preceding input bits;
   a partitioner for partitioning the second number of output bits into the two portions of output bits; and
   a transmitter for transmitting the output bits of the first portion via a first channel and the output bits of the second portion via a second channel, the second channel being spatially different from the first channel.

7. The apparatus of claim 6, in which:
   the certain number of preceding bits is 6; and
   the convolutional encoder comprises three generator polynominals $g_1$, $g_2$ and $g_3$ having the following binary form:
   $g_1$=1100111,
   $g_2$=1011101, and
   $g_3$=1110011.

8. The apparatus of claim 6 which further comprises a puncturing unit operative to discard at least one predetermined bit of the encoded bitstream such that the second number of output bits is an even number, wherein the first and second portions of output bits comprise the same number of output bits.

9. An apparatus for transmitting information, comprising:
   a bitstream source for providing a bitstream representing the information;
   a redundancy adding encoder for generating an encoded bitstream based on the bitstream provided by the bitstream source wherein the encoder is arranged to output, for a first number of input bits, a second number of output bits, the second number of output bits having at least twice as many output bits as the first number of input bits, and wherein the second number of output bits includes two portions of output bits, each portion of output bits individually allowing the retrieval of information represented by the first number of input bits, and the first portion of output bits being coded based on the bitstream in a different way with respect to the second portion of output bits;

a partitioner for partitioning the second number of output bits into the two portions of output bits; and a transmitter for transmitting the output bits of the first portion via a first channel and the output bits of the second portion via a second channel, the second channel being spatially different from the first channel;

the redundancy adding encoder is operative to code the bitstream provided by the bitstream source in a bit-by-bit fashion;

the partitioner includes a parallel storage for storing a predetermined amount of output bits of the convolutional encoder;

a parallel-to-serial converter for producing a serial stream of the stored bits to be partitioned into the first and second portion of output bits is provided; and a de-multiplexer for performing the partition of the serial stream of output bits into the first and second portions is provided.

10. An apparatus for receiving information, the information being represented by an encoded bitstream, the encoded bitstream being encoded such that its redundancy is at least doubled with respect to a bitstream from which the encoded bitstream is derived, and that, for a first number of bits of the bitstream, the encoded bitstream comprises a second number of bits, the second number of bits having at least twice as many bits as the first number, and wherein the second number of bits includes two portions of bits, each portion of bits individually allowing the retrieval of information represented by the first number of bits, and the first portion of the bits being encoded in a different way with respect to the second portion of bits, the apparatus comprising:

receiving means for receiving the first portion of bits via a first channel and the second portion of bits via a second channel, the first and the second channels being spatially different from each other;

a combiner for combining the first and the second portions the combiner including a depuncturing unit for performing a depuncturing operation on the first and second portions of bits to compensate for a puncturing operation performed in a transmitter; and a decoder for decoding the coded bitstream by removing redundancy from the coded bitstream, the decoder using the first and second portions of bits combined by the combiner.

11. The apparatus of claim 10, in which the receiving means further includes delay means for delaying the portion of bits received via one channel to compensate for a delay imposed on the portion of bits received via the other channel.

12. The apparatus of claim 11, in which the combiner includes a multiplexer for multiplexing first and second portions into a form suitable for the decoder.

13. An apparatus for receiving information, the information being represented by an encoded bitstream, the encoded bitstream being encoded such that its redundancy is at least doubled with respect to a bitstream from which the encoded bitstream is derived, and that, for a first number of bits of the bitstream, the encoded bitstream comprises a second number of bits, the second number of bits having at least twice as many bits as the first number, and wherein the second number of bits includes two portions of bits, each portion of bits individually allowing the retrieval of information represented by the first number of bits, and the first portion of the bits being encoded in a different way with respect to the second portion of bits, the apparatus comprising:

receiving means for receiving the first portion of bits via a first channel and the second portion of bits via a second channel, the first and the second channels being spatially different from each other;

a combiner for combining the first and the second portions;

a decoder for decoding the coded bitstream by removing redundancy from the coded bitstream, the decoder using the first and second portions of bits combined by the combiner, the decoder comprising a soft decision decoder processing probabilities in that a received bit represents a high or low state rather than an actual wave form characteristic of the received bitstream; and depuncturing means for compensating for a puncturing operation in a transmitter is provided and attributes to a bit to be depunctured equal probabilites for the high and low states.

14. The apparatus of claim 13 in which the decoder includes a Viterbi decoder performing maximum likelihood decoding using the state information of the first and second channels.

15. The apparatus of claim 14 in which the decoder further comprises a Reed-Solomon decoder fed by the Viterbi decoder for undoing a Reed-Solomon encoding performed in the transmitter.

16. The apparatus of claim 13 in which:

the decoder comprises a signal to noise ratio evaluating means for determining a channel having a low signal to noise ratio; and a bit replacing means for replacing the bits of a portion of bits received via a channel having a low signal to noise ratio by values equivalent to a lower reliability for the high and low states.

17. The apparatus of claim 13 in which the receiving means comprises, for each channel, a QPSK demodulator for providing the first and the second portions of bits.

18. A method of transmitting information, comprising the following steps:

providing a bitstream representing the information;

generating a redundancy added encoded bitstream based on the bitstream provided in the step of providing, wherein for a first number of input bits, a second number of output bits is generated, the second number of output bits having at least twice as many output bits as the first number of input bits, and wherein the second number of output bits includes two portions of output bits, each portion of output bits individually allowing the retrieval of information represented by the first number of input bits, and the first portion of output bits being coded based on the bitstream in a different way with respect to the second portion of output bits;

partitioning the second number of output bits into the two portions of output bits; and transmitting by use of a single transmitter the output bits of the first portion via a first channel and the output bits of the second portion via a second channel, the second channel being spatially different from the first channel;

the first channel being defined by the single transmitter and a first position of a mobile receiver;

the second channel being defined by the single transmitter and a second position of the mobile receiver; and the step of transmitting comprising the following substeps: transmitting the first portion of output bits; and delaying the second portion of output bits before transmitting via the second channel such that time diversity is obtained.

19. A method of transmitting information, comprising the following steps:

providing a bitstream representing the information;

generating a redundancy added encoded bitstream based on the bitstream provided in the step of providing, wherein for a first number of input bits, a second number of output bits is generated, the second number of output bits having at least twice as many output bits as the first number of input bits, and wherein the second number of output bits includes two portions of output bits, each portion of output bits individually allowing the retrieval of information represented by the first number of input bits, and the first portion of output bits being coded based on the bitstream in a different way with respect to the second portion of output bits;

partitioning the second number of output bits into the two portions of output bits; and transmitting the output bits of the first portion via a first channel and the output bits of the second portion via a second channel, the second channel being spatially different from the first channel the step of transmitting being carried out by a first transmitter and a second transmitter spaced apart from the first transmitter;

the first channel being defined by the first transmitter and the receiver; and the second channel being defined by the second transmitter and the receiver such that space diversity is obtained.

20. The method of claim 19, in which:

the first and second transmitters include two satellites in different orbital positions, such that the first channel is defined by an uplink connection from earth to the first satellite and a downlink connection from the first satellite to a receiver on earth, and such that the second channel is defined by a uplink connection from earth to the second satellite and a downlink connection from the second satellite to the receiver on earth.

21. The method of claim 19, in which:

one transmitter includes a satellite; and the other transmitter includes a terrestrial sender such that terrestrial diversity is obtained.

22. The method of claim 19, in which the step of transmitting further includes the following substeps: delaying the second portion of output bits transmitted via the second channel such that time diversity is obtained.

23. A method of transmitting information, comprising the following steps:

providing a bitstream representing the information;

generating a redundancy added encoded bitstream based on the bitstream provided in the step of providing, wherein for a first number of input bits, a second number of output bits is generated, the second number of output bits having at least twice as many output bits as the first number of input bits, and wherein the second number of output bits includes two portions of output bits, each portion of output bits individually allowing the retrieval of information represented by the first number of input bits, and the first portion of output bits being coded based on the bitstream in a different way with respect to the second portion of output bits;

the generating step being carried out by means of a convolutional encoder for obtaining a code rate less than or equal to 0.5, wherein the code rate is the ratio of the first number of input bits to the second number of output bits, the convolutional encoder combining a current input bit to be encoded with at least one of a certain number of preceding input bits;

partitioning the second number of output bits into the two portions of output bits; and transmitting the output bits of the first portion via a first channel and the output bits of the second portion via a second channel, the second channel being spatially different from the first channel.

24. The method of claim 23, in which:

the certain number of preceding bits is 6; and the convolutional encoder comprises three generator polynominals $g_1$, $g_2$ and $g_3$ having the following binary form:

$g_1$=1100111, $g_2$=1011101, and $g_3$=1110011.

25. The method of claim 23 which further comprises the step of puncturing to discard at least one predetermined bit of the encoded bitstream such that the second number of output bits is an even number, wherein the first and second portions of output bits comprise the same number of output bits.

26. A method of transmitting information, comprising the following steps:

providing a bitstream representing the information;

generating a redundancy added encoded bitstream based on the bitstream provided in the step of providing, by coding the bitstream provided by the bitstream source in a bit-by-bit fashion, wherein for a first number of input bits, a second number of output bits is generated, the second number of output bits having at least twice as many output bits as the first number of input bits, and wherein the second number of output bits includes two portions of output bits, each portion of output bits individually allowing the retrieval of information represented by the first number of input bits, and the first portion of output bits being coded based on the bitstream in a different way with respect to the second portion of output bits;

producing a serial stream of the stored bits to be partitioned into the first and second portion of output bits by the step of parallel-to-serial converting;

partitioning the second number of output bits into the two portions of output bits by de-multiplexing; and transmitting the output bits of the first portion via a first channel and the output bits of the second portion via a second channel, the second channel being spatially different from the first channel.

27. A method of receiving information, the information being represented by an encoded bitstream, the encoded bitstream being encoded such that its redundancy is at least doubled with respect to a bitstream from which the encoded bitstream is derived, and that, for a first number of bits of the bitstream, the encoded bitstream comprises a second number of bits, the second number of bits having at least twice as many bits as the first number, and wherein the second number of bits includes two portions of bits, each portion of bits individually allowing the retrieval of information represented by the first number of bits, and the first portion of the bits being encoded in a different way with respect to the second portion of bits, the method comprising the following steps:

receiving the first portion of bits via a first channel and the second portion of bits via a second channel, the first and the second channels being spatially different from each other;

combining the first and the second portions;

performing a depuncturing operation on the first and second portions of bits to compensate for a puncturing operation performed in a transmitter; and decoding the coded bitstream by removing redundancy from the coded bitstream, wherein the first and second portions of bits combined in the step of combining are used in the step of decoding.

28. The method of claim 27, in which the step of receiving further includes the step of delaying the portion of bits received via one channel to compensate for a delay imposed on the portion of bits received via the other channel.

29. The method of claim 27, in which the step of combining includes the step of multiplexing the first and second portions into a form suitable for the step of decoding.

30. The method of claim 27, in which the step of receiving comprises, for each channel, the step of QPSK demodulating for providing the first and the second portions of bits.

31. A method of receiving information, the information being represented by an encoded bitstream, the encoded bitstream being encoded such that its redundancy is at least doubled with respect to a bitstream from which the encoded bitstream is derived, and that, for a first number of bits of the bitstream, the encoded bitstream comprises a second number of bits, the second number of bits having at least twice as many bits as the first number, and wherein the second number of bits includes two portions of bits, each portion of bits individually allowing the retrieval of information represented by the first number of bits, and the first portion of the bits being encoded in a different way with respect to the second portion of bits, the method comprising the following steps:

receiving the first portion of bits via a first channel and the second portion of bits via a second channel, the first and the second channels being spatially different from each other;

combining the first and the second portions; and decoding the coded bitstream by removing redundancy from the coded bitstream by soft decision decoding to process probabilities such that a received bit represents a high or low state rather than an actual wave form characteristic of the received bitstream, wherein the first and second portions of bits combined in the step of combining are used in the step of decoding; and a step of depuncturing for compensating for a puncturing operation in a transmitter is carried out and attributes to a bit to be depunctured equal probabilites for the high and low states.

32. The method of claim 31 in which the step of decoding includes a Viterbi decoder performing maximum likelihood decoding using the state information of the first and second channels.

33. The method of claim 32 in which the step of decoding further comprises a Reed-Solomon decoder fed by the Viterbi decoder for undoing a Reed-Solomon encoding performed in the transmitter.

34. The method of claim 31, in which:

the step of decoding includes the step of signal to noise ratio evaluating for determining a channel having a low signal to noise ratio; and the step of bit replacing for replacing the bits of a portion of bits received via a channel having a low signal to noise ratio by equal probabilities for the high and low states is carried out.

35. The method of claim 31, in which the step of receiving comprises, for each channel, the step of QPSK demodulating for providing the first and second portions of bits.

\* \* \* \* \*